United States Patent
Araki et al.

(10) Patent No.: US 7,949,418 B2
(45) Date of Patent: May 24, 2011

(54) SAFETY PROGRAMMABLE LOGIC CONTROLLER

(75) Inventors: Tsutomu Araki, Okazaki (JP); Kuniyuki Niwa, Kariya (JP); Friedrich Adams, Wettenberg (DE)

(73) Assignee: Jtekt Corporation, Osaka-shi (JP)

( * ) Notice: Subject to any disclaimer, the term of this patent is extended or adjusted under 35 U.S.C. 154(b) by 1204 days.

(21) Appl. No.: 11/493,521

(22) Filed: Jul. 27, 2006

(65) Prior Publication Data

US 2007/0055863 A1 Mar. 8, 2007

(30) Foreign Application Priority Data

Jul. 29, 2005 (JP) ................. 2005-221996

(51) Int. Cl.
G05B 19/42 (2006.01)
G06F 21/00 (2006.01)
G05B 11/01 (2006.01)
G05B 9/02 (2006.01)
G05B 15/00 (2006.01)

(52) U.S. Cl. ............... 700/86; 700/21; 700/79; 700/83; 713/184

(58) Field of Classification Search ............ 700/21, 700/79, 83, 86; 713/184
See application file for complete search history.

(56) References Cited

U.S. PATENT DOCUMENTS

| | | | |
|---|---|---|---|
| 6,532,508 B2 * | 3/2003 | Heckel et al. | 710/110 |
| 6,647,301 B1 * | 11/2003 | Sederlund et al. | 700/79 |
| 6,778,080 B2 * | 8/2004 | Veil et al. | 340/506 |
| 7,076,311 B2 * | 7/2006 | Schuster | 700/21 |
| 7,430,451 B2 * | 9/2008 | Muneta et al. | 700/21 |
| 7,610,119 B2 * | 10/2009 | Abe et al. | 701/1 |
| 2004/0010326 A1 | 1/2004 | Schuster | |
| 2004/0210326 A1 * | 10/2004 | Muneta et al. | 700/82 |
| 2004/0215354 A1 * | 10/2004 | Nakamura et al. | 700/21 |
| 2005/0203645 A1 * | 9/2005 | Klopfer et al. | 700/79 |

FOREIGN PATENT DOCUMENTS

| | | |
|---|---|---|
| DE | 198 12 424 A1 | 9/1999 |
| DE | 102 29 704 A1 | 1/2004 |
| JP | 61-32157 | 2/1986 |
| JP | 1-276358 | 11/1989 |
| JP | 7-64479 | 3/1995 |
| JP | 2002-358106 | 12/2002 |
| JP | 2003-263205 | 9/2003 |
| JP | 2004-62610 | 2/2004 |

OTHER PUBLICATIONS

U.S. Appl. No. 11/484,655, filed Jul. 12, 2006, Niwa.

* cited by examiner

*Primary Examiner* — Christian LaForgia
(74) *Attorney, Agent, or Firm* — Oblon, Spivak, McClelland, Maier & Neustadt, L.L.P.

(57) ABSTRACT

A safety PLC includes an I/O module to which a safety device for detecting a predetermined condition at any time is connected, a CPU module that executes a safety program for managing the I/O module, and a communication unit that interconnects the I/O module and the CPU module with each other. The CPU module includes: a PIN code memory that stores a PIN code for authenticating that the safety program satisfies a predetermined standard; a PIN code input unit that allows a user to designate the PIN code; a program auto-creating unit that automatically creates the safety program; and a program authentication unit that puts the safety program into an executable condition when the PIN code designated by the user coincides with the PIN code stored in the PIN code memory.

4 Claims, 5 Drawing Sheets

SAFETY PROGRAMMABLE LOGIC CONTROLLER

BACKGROUND OF THE INVENTION

The present invention relates to a safety programmable logic controller (PLC) having an I/O module to which a safety device for detecting a predetermined condition at any time is connected or a CPU module for executing a safety program (e.g., a sequence program), and more particularly, to an authentication control for authenticating the safety program when the safety program is automatically created.

Recently, a safety function is commonly introduced into a system controller using a programmable logic controller (PLC). The safety function includes, for example, a function for duplexing a CPU, an MPU, or various processing units to allow the processing result to be appropriately output, and a function of safely stopping a system by halting a system operation or a feed operation when an emergency condition occurs in the system, and the like. For example, the emergency condition may occur when an emergency stop switch is pressed or when a sensor such as a light curtain detects invasion of a person.

For example, a safety PLC introduced for organizing such a system is disclosed in a patent document 1, in which a hardware construction is duplexed. Hereinafter, a sequence program for controlling the safety PLC is referred to as a safety program. A standard for creating a safety program has been published from, for example, an international electro-technical commission (IEC). Conventionally, in order to produce a safety program which satisfies this standard, a high level of technical knowledge for the safety standard or experience of producing the safety program is required.
Patent Document 1: Japanese Unexamined Patent Application Publication No. 2002-358106

As a new technology for obtaining a high quality safety program having a high level of safety and reducing burdens of programmers for obtaining the aforementioned safety program, a method for automatically creating a safety program can be conceived. Nevertheless, even when the safety program can be automatically created on the safety PLC, an administrator (having a license) of the safety program that has been automatically created should perform a safety authentication procedure.

SUMMARY OF THE INVENTION

The present invention is contrived to solve the aforementioned problems, and an object of the invention is to allow a safety program to be easily created and the authentication for the safety program to be performed.

In order to solve the aforementioned problems, the following arrangements are effective.

A first means of the present invention provides a safety programmable logic controller (PLC) comprising an I/O module to which a safety device for detecting a predetermined condition at any time is connected, a central processing unit (CPU) module for executing a safety program for managing the I/O module, and a communication unit for interconnecting the modules with each other, wherein the CPU module includes a PIN code memory for storing a PIN code for authenticating that the safety program satisfies a predetermined standard, a PIN code input unit for allowing a user to designate the PIN code, a program auto-creating unit for automatically-creating the safety program, and a program authentication unit for allowing the safety program to be adjusted to an executable condition when the PIN code designated by the user coincides with the PIN code stored in the PIN code memory.

Herein, the PIN code refers to a personal identification number, and is used as a password for identifying an individual user. In addition, the aforementioned standard may include an international electrotechnical commission (IEC) standard.

A second aspect of the present invention is characterized in that, in the first aspect of the present invention, the CPU module includes an identification (ID) number obtaining unit for obtaining an ID number representing a classification of a corresponding I/O module from the I/O module connected to the communication unit, and the safety program is automatically created by sequentially linking predetermined function blocks corresponding to each ID number based on a connection order of the I/O modules or a slot number order of the slots to which the I/O modules are connected.

A third aspect of the present invention is characterized in that, in the second aspect of the present invention, the CPU module includes an ID number input unit for allowing a user to designate the ID number and an ID number memory for storing the ID number input from the ID number input unit, and the program authentication unit includes an ID number comparison unit for comparing the ID number obtained from the ID number obtaining unit with the ID number obtained from the ID number memory when the safety program that has been automatically created is executed.

In this case, the safety program may be automatically created on the main memory device, and then, adjusted to an executable condition. Alternatively, the safety program that has been automatically created may be stored in the secondary memory device, and then, the safety program stored in the main memory device may be adjusted to an executable condition. Otherwise, the safety program that has been automatically created and stored in the secondary memory device may be loaded on the main memory device again, and then, may be adjusted to an executable condition.

The aforementioned problems can be effectively or appropriately solved through the aforementioned aspects of the present invention.

The aforementioned aspects of the present invention can provide effects as follows.

According to the first aspect of the present invention, since an authentication procedure for the safety program using the PIN code can be performed on the safety PLC, an operational tool such as a PC is not necessary. Therefore, it is possible to reduce cumbersome works for installing, conveying, and connecting the operational tool such as a PC. In addition, the manipulation required to perform the authentication procedure can be made to be simpler. Furthermore, it is possible to reduce a time for understanding the manipulation for the authentication procedure.

The aforementioned construction of the safety PLC may become more effective by providing at least the second aspect of the present invention. Based on the construction of the safety system using the safety PLC having the second aspect of the present invention, a desired safety system can be implemented in a simplest manner. For example, it is possible to construct a program auto-creating unit in detail according to the aforementioned construction.

According to the third aspect of the present invention, the ID numbers of each I/O module included in the safety PLC can be simultaneously authenticated when an authentication procedure is performed. In this case, a user of the safety system can sequentially and individually verify whether or not there is a shortage or a surplus in the I/O modules to be connected, classifications of each I/O module, or a connection order of them, and the like, through the CPU module. As a result, a user of the safety program can accurately and surely verify whether or not a basic construction of the safety program is appropriate in the unit of the I/O module at the same time during the authentication procedure.

Further, since the ID numbers of each I/O module can be verified, it is possible to detect a registration error that can occur when a predetermined ID number of each I/O module is inappropriately registered.

Therefore, according to the first aspect of the present invention, a desired safety system can be more appropriately and surely constructed or authenticated.

Furthermore, according to the third aspect of the present invention, a connection construction of the I/O modules that have been directly authenticated by a user's manipulation is directly stored in the ID number memory, and the ID number comparison unit performs a comparison processing based on the ID number memory information. As a result, when the safety program that has been automatically created and then stored in the secondary memory device is read from the secondary memory device to be executed, it is possible to accurately detect any change of the connection construction based on the ID number memory information even when the connection construction of the I/O modules is changed in comparison with the initial system construction that has been automatically created by the safety program.

Therefore, according to the third aspect of the present invention, the connection construction of the I/O modules directly authenticated by the self manipulation of a user can be surely implemented based on the ID number memory information.

BRIEF DESCRIPTIONS OF THE DRAWINGS

DETAILED DESCRIPTION OF PREFERRED EMBODIMENTS

Hereinafter, embodiments of the present invention will be described in detail with reference to the accompanying drawings.

However, the embodiments of the present invention should not be understood in a limitative sense.

Embodiment 1

Figure 1:
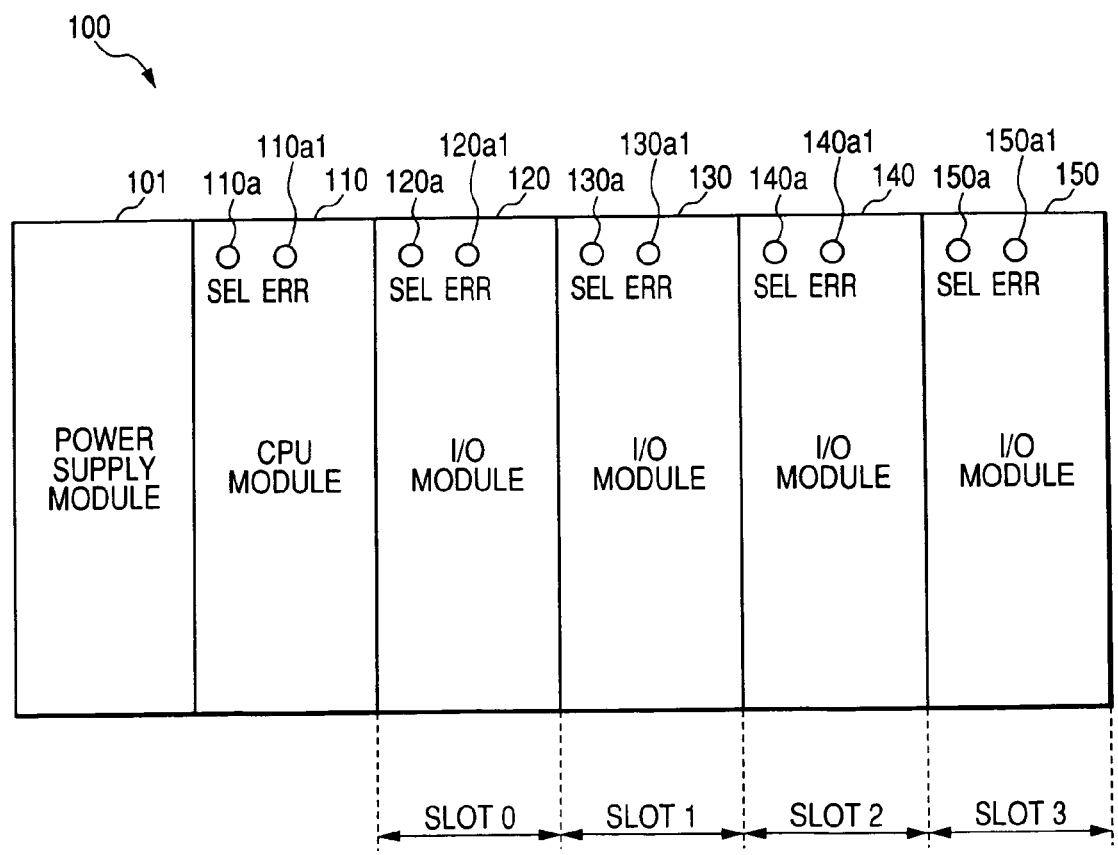
FIG. 1 is a schematic diagram illustrating a connection construction of I/O modules of a safety PLC 100 according to the first embodiment of the present invention.

FIG. 1 is a schematic diagram illustrating a logic construction of a safety PLC 100 according to the first embodiment of the present invention. The safety PLC 100 includes a power supply module 101, a CPU module 110 for executing a safety program for managing I/O modules, a standard device I/O module 120, and optional device I/O modules 130 and 140. Hereinafter, the standard device I/O module 120 is referred to as a master module 120. The master module 120 has a safety function such as an emergency stop function or a power supply on/off control function according to a standard.

A safety device for detecting a predetermined condition relating to safety at any time is connected to each I/O module. Additionally, each I/O module is constructed to satisfy an individual specification customized to each connectable safety device. For example, these safety devices may include various detection devices such as a duplexed emergency stop button, a light curtain, a door lock sensor, a mat switch, and a laser scanner.

Each module includes a micro-processing unit (MPU), a random access memory (RAM), a read-only memory (ROM), an input/output (I/O) interface, and the like. An input/output bus 102 is connected between each of the modules as shown in FIG. 2 as connecting means.

Slot selection lamps 110a, 120a, 130a, 140a, and 150a provided in each module are constructed of a light emitting diode (LED), and may be turned on/off or flickered depending on a user's manipulation or a system condition.

Figure 2:
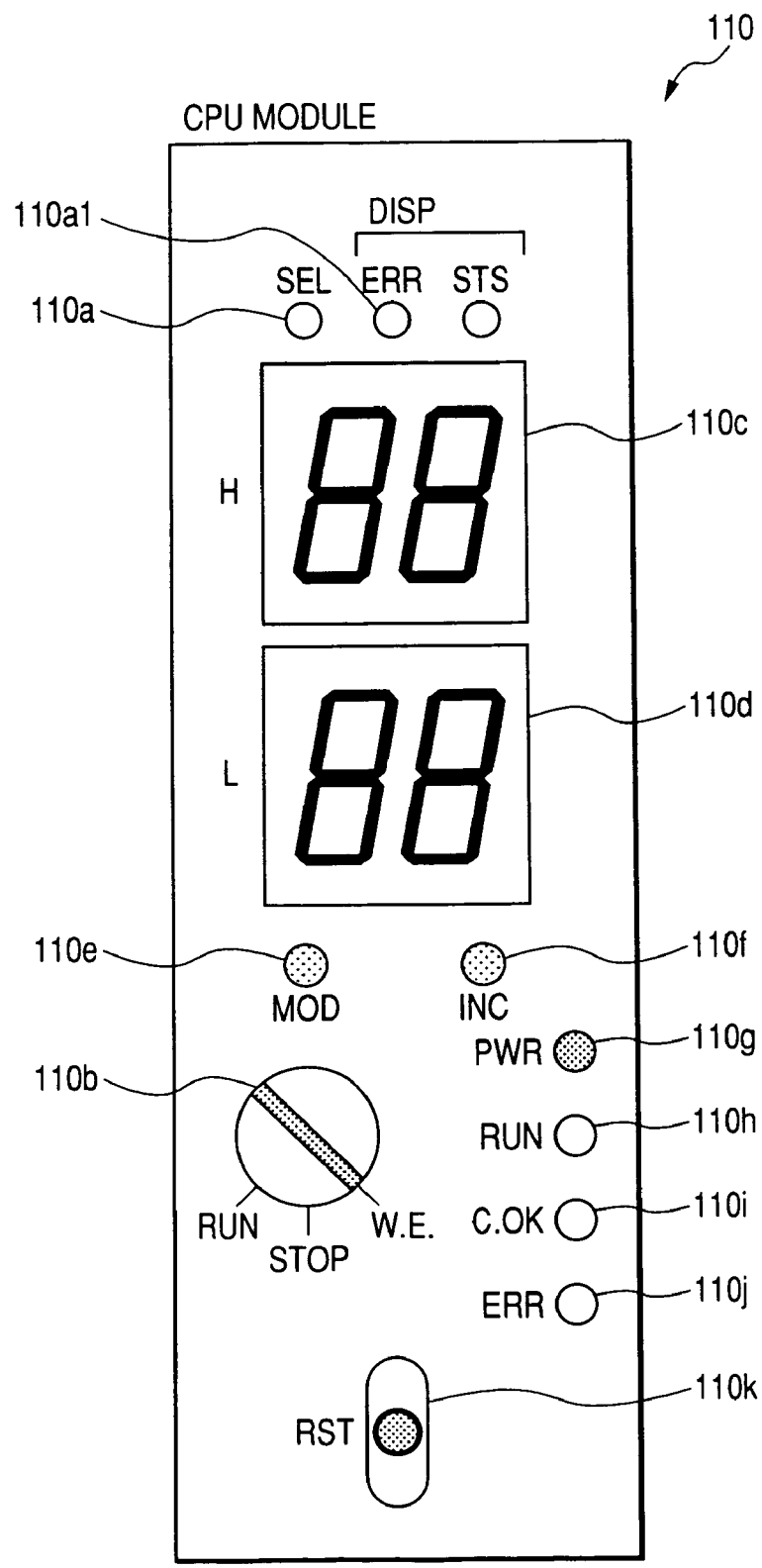
FIG. 2 is a front view illustrating a CPU module 110.

FIG. 2 is a front view illustrating the CPU module 110.

A key switch 110b allows a user to selectively set the mode of the safety PLC 100. A user may select one of the following modes:

(Mode 1) RUN: a mode for running a predetermined safety program that has been installed;

(Mode 2) STOP: a mode for stopping a predetermined safety program that has been installed; and (Mode 3) W.E.: a mode for executing an install program.

Although the identification information display 110c for showing uppermost two digits (H) and the identification information display 110d for showing lowermost two digits (L) are provided to display predetermined identification information (such as a PIN code or an ID number) input by a user, they may display other information such as a system mode.

An MOD button 110e and an INC button 110f constitute a PIN code input unit of the present invention. The MOD button 110e may be used when an input field (H or L) or an input mode should be changed. On the contrary, the INC button 110f is used when numerical values of the input data should be designated. However, other information such as the ID number may be input by using this PIN code input unit.

For example, '03'h (03 in a hexadecimal expression) may be input into the lowermost field L of a four digit variable by pressing the INC button 110f three times in a corresponding input mode. Subsequently, the input value in that field may be finally decided by pressing the MOD button 110e, and then, a mode may be changed into a manipulation mode.

The remaining portions in FIG. 2 will be described.

PWR lamp 110g indicates that a power supply is turned on.

RUN lamp 110h indicates that the safety program is being executed.

C.OK lamp 110i indicates whether or not the condition of the safety program is executable when a connection construction of each I/O module is uniquely determined.

ERR lamp 110j indicates that an abnormal condition occurs.

RST switch 110k is a reset switch.

Figure 3:
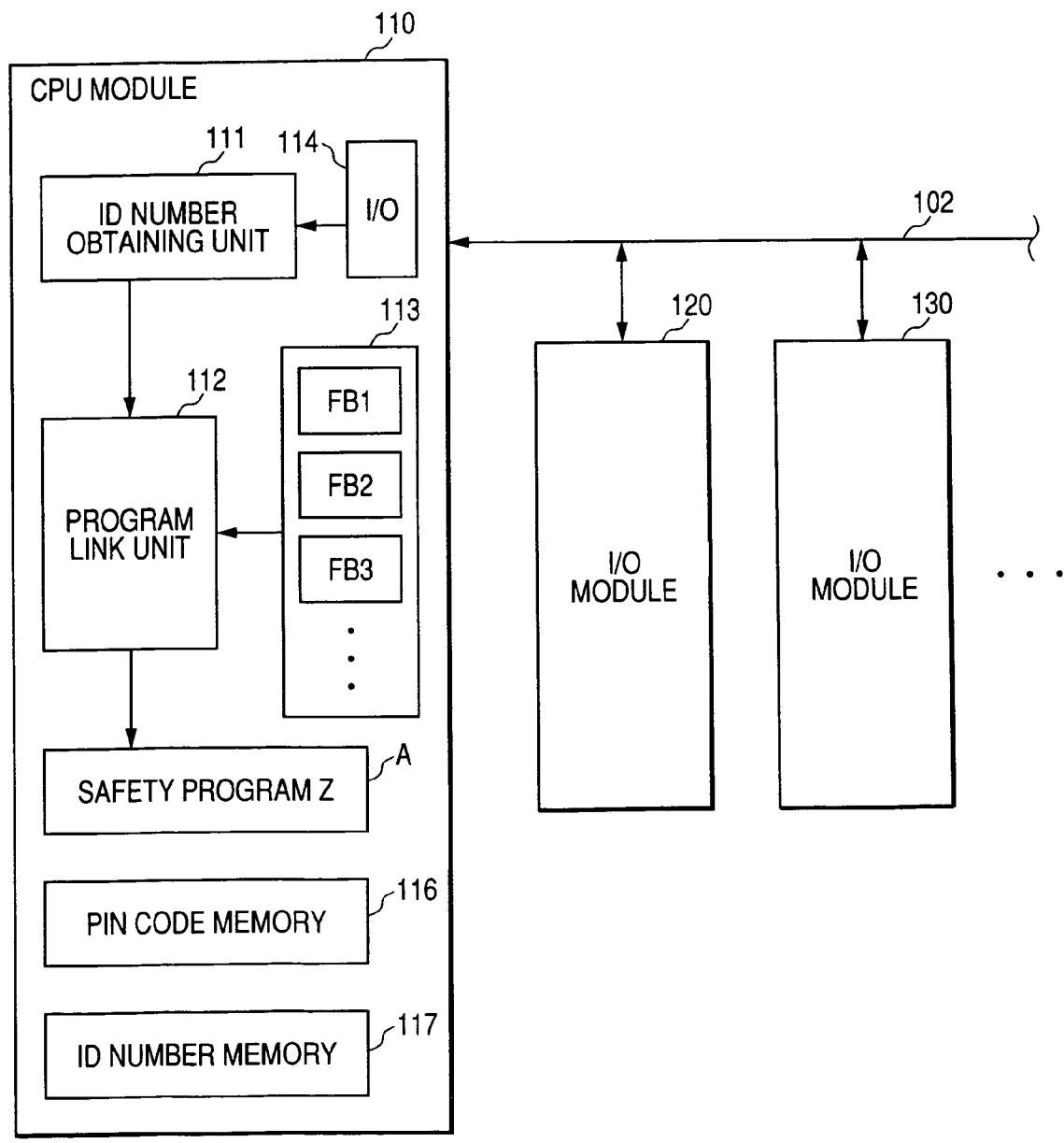
FIG. 3 is a functional block diagram illustrating a logic construction of a CPU module 110.

FIG. 3 is a block diagram illustrating a logic construction of the CPU module 110. The CPU module 110 includes an ID number obtaining unit 111, a program link unit 112, and a function block memory 113. The function block memory 113 stores a plurality of function blocks FB1, FB2, FB3, . . . in which a ladder circuit for computing output signals to be determined depending on input signals from each safety device is programmed for each connection specification of each safety device. The ladder circuit satisfies a predetermined safety standard. Therefore, these function blocks FB1, FB2, FB3, . . . , also satisfy a corresponding safety standard.

Incidentally, the aforementioned standard may include an international electrotechnical commission (IEC) standard.

The ID acquiring unit 111 reads ID numbers of each I/O module 120, 130, 140, and 150 connected to the I/O bus 102 through the I/O area 114. The program link unit 112 sequentially links the function blocks allocated from the function block memory 113 based on the read ID numbers so as to automatically create a safety program Z on a predetermined area A in the main memory device.

Since the corresponding function block can be uniquely determined based on the ID number, the safety function associated with each safety device can be individually implemented in the unit of a function block that has been prepared.

The CPU module 110 includes a PIN code memory 116 for storing an initial value (i.e., an initial registration value) of a PIN code that should be initially registered by a predetermined authenticated person when the safety PLC 100 is initially set, and an ID number memory 117 for storing an ID number of each I/O module input by the user from the PIN code input unit (using the MOD button 110e and the INC button 110f) when the safety program is introduced or reorganized. The PIN code memory 116 and the ID number memory 117 are constituted on a secondary memory device provided in the CPU module 110. Incidentally, the PIN code refers to a personal identification number, and is used as a password for identifying an individual user.

Hereinafter, a relationship between the safety program Z and the I/O area 14 will be described with reference to FIG. 4. An I/O region 1140 for the slot 0 of FIG. 1 is defined on top of the I/O area 114. This I/O region 1140 is used as an input/output interface region with the I/O module 120 (i.e., the master module) of FIG. 1, and may store a sufficient number of input and output variables used for a communication with the I/O module 120. Similarly, each of the remaining I/O regions 1141, 1142, . . . corresponds to each slot.

The address lookup table 115 is provided to define a relationship of each input/output variable between the I/O area 114 and the factor area A2. In this case, it is important that, since each function block FB1, FB2, FB3, . . . of FIG. 3 is prepared for each ID number which uniquely represents a classification of the I/O module, the ID number uniquely corresponds to the FB number, and each I/O module can be allocated to each function block corresponding to its FB number based on the relationship and the address lookup table 115 which manages a top address of each I/O region. Therefore, the storage area (e.g., an external variable storage area) for storing the input and output information of each function block included in the safety program Z is uniquely related with and allocated to each I/O region 1140, 1141, . . . .

Hereinafter, a construction and operations of the safety program Z automatically created on a predetermined main memory area A will be described with reference to FIG. 4.

Although the procedure unit $Z_{PR}$ of the safety program Z is created on the program area A1 in the area A, the factor used by the procedure unit $Z_{PR}$ is located in the internal variable area A2. The procedure unit $Z_{PR}$ reads the variable (e.g., an input variable) representing the condition of each I/O module from the I/O area 114 and inputs it to the corresponding factor area A2 as an initial processing (in1) in a predetermined first control period. Then, each function block FB1, FB2, FB3, . . . is sequentially executed by referencing these factors at any time.

Each factor stored in the factor area A2 is referenced or updated when the procedure unit $Z_{PR}$ is executed. Then, as a final processing (out 1) in the first control period, the procedure unit $Z_{PR}$ outputs the variable representing instructions for each I/O module and the like, from the factor area A2 to the I/O area 114. In this case, the output operation out1 performed by the procedure unit $Z_{PR}$ in FIG. 4 is exclusively executed from the operation for the I/O area 114 through the input/output bus 102.

Before and after the aforementioned operation of the procedure unit $Z_{PR}$, the data are received and transmitted from/into the I/O area 114 through the I/O bus 102.

Figure 5:
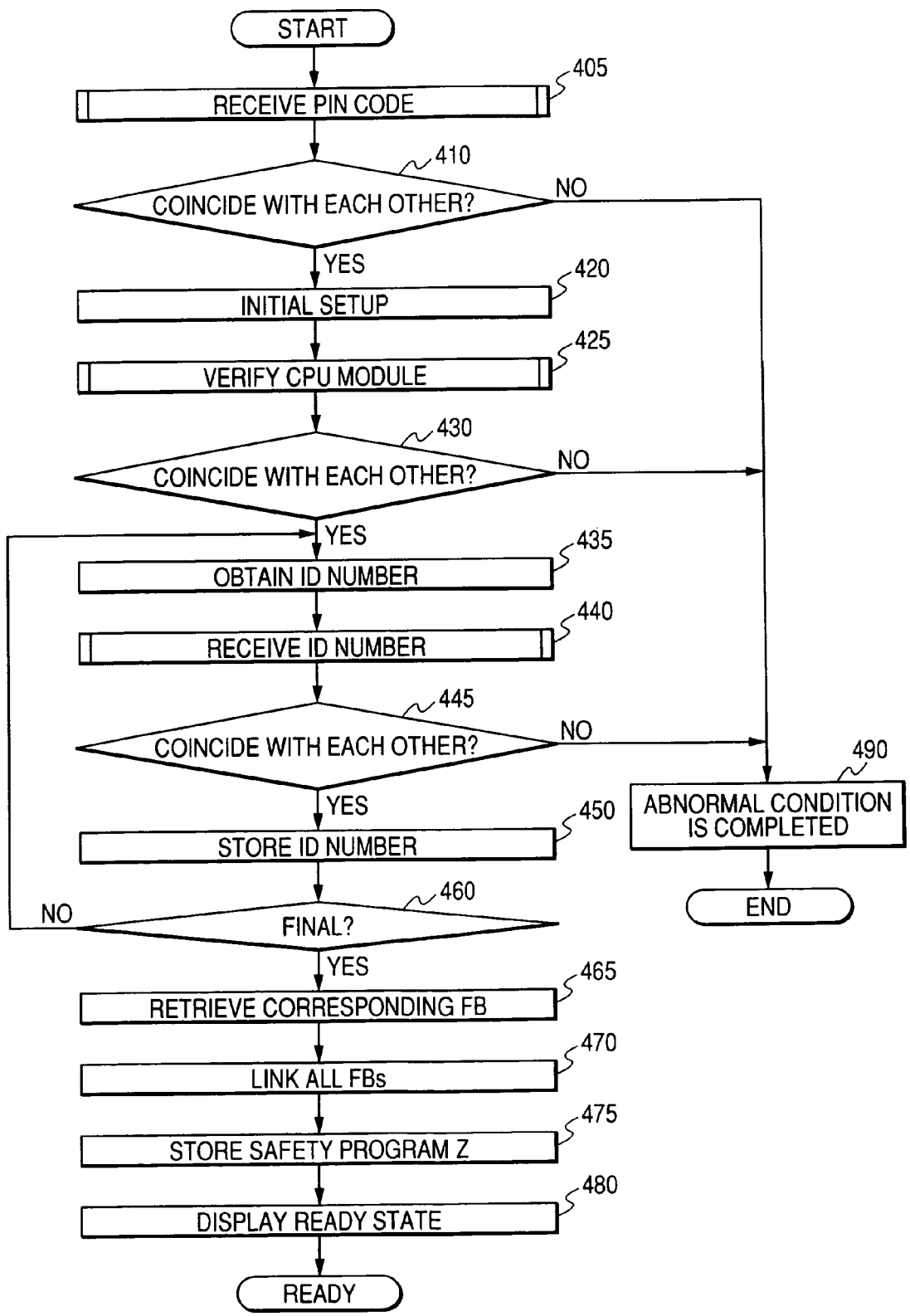
FIG. 5 is a flowchart illustrating an authentication procedure for the safety program which is automatically created.

FIG. 5 is a flowchart illustrating an authentication procedure for the safety program Z which is automatically created. This flowchart also shows a control procedure for the CPU module 110 after the state is changed into the aforementioned condition 3 (W.E. in FIG. 2) by changing the key switch 110b, and a connection construction of each I/O module is uniquely defined until the safety program is in an executable condition. In other words, an install program for executing this control procedure can be called by changing the state of the key switch 110b into the condition 3 (W.E.).

In this flowchart, the steps 410 and 445 constitute a program authentication unit of the present invention. Particularly, in the step 445, the ID number comparison unit included in the program authentication unit according to the present invention is implemented.

Hereinafter, this control procedure will be described in detail with reference to FIG. 5.

Initially, in the step 405, the CPU module 110 is changed to an input receipt condition of the PIN code. In this case, a user is urged to input the PIN code by blinking the C.OK lamp 110i. When a user completes the input operation of the four digit PIN code by using the PIN code input unit (such as the MOD button 110e and the INC button 110f), the process advances to the step 410. In other words, if the initial registration value registered in the PIN code memory 116 coincides with the four digit PIN code, the process advances to the step 420. Otherwise, the process advances to the step 490. In the step 490, the aforementioned processing is terminated.

On the other hand, in the step 420, an initial setup processing for the CPU module 110 is executed. The initial setup processing may be performed as follows:

(1) Clear the main memory area A, and
(2) Clear the ID number memory 117.

Subsequently, in the step 425, a manipulation for verifying the CPU module is received. In this case, a user is notified of a fact that the ID number of this module should be input by turning on the slot selection lamp 110a of the CPU module of FIGS. 1 and 2. In the next step 430, it is verified whether or not a predetermined ID number (for example, (H, L)=('00'h, '00'h)) is appropriately input. If it is determined that the ID number is appropriately input, the slot selection lamp 110a of the corresponding module is turned off, and then, the process advances to the step 435. Otherwise, the error lamp 110a1 of the corresponding module is turned on, and the process advances to the step 490.

In the step 435, the slot selection lamp of the I/O module connected to the next slot is turned on, so that a user is notified of a fact that the ID number of this module should be input, and the ID number of that I/O module is obtained by using the ID number obtaining unit 111.

In the step 440, a manipulation for verifying the I/O module is received.

Then, in the step 445, it is verified whether or not a predetermined ID number (for example, (H, L)=('00'h, '01'h)) is appropriately input. If it is verified that the input ID number coincides with the ID number of the I/O module obtained by using the ID number obtaining unit 111, the slot selection lamp of the corresponding module is turned off, and the process advances to the step 450. Otherwise, the error lamp of the corresponding module is turned on, and the process advances to the step 490.

In the step 450, the ID number of the corresponding I/O module that has been verified is stored in the ID number memory 117.

Subsequently, in the step 460, it is determined whether or not the corresponding I/O module is the last I/O module. If it is determined that the corresponding I/O module is the last one, the process advances to the step 465. Otherwise, the process advances to the step 435.

In the step 465, based on the ID number stored in the ID number memory 117, each function block FB1, FB2, . . . corresponding to the ID number is retrieved, and each of them is allocated to the function block memory 113.

Figure 4:
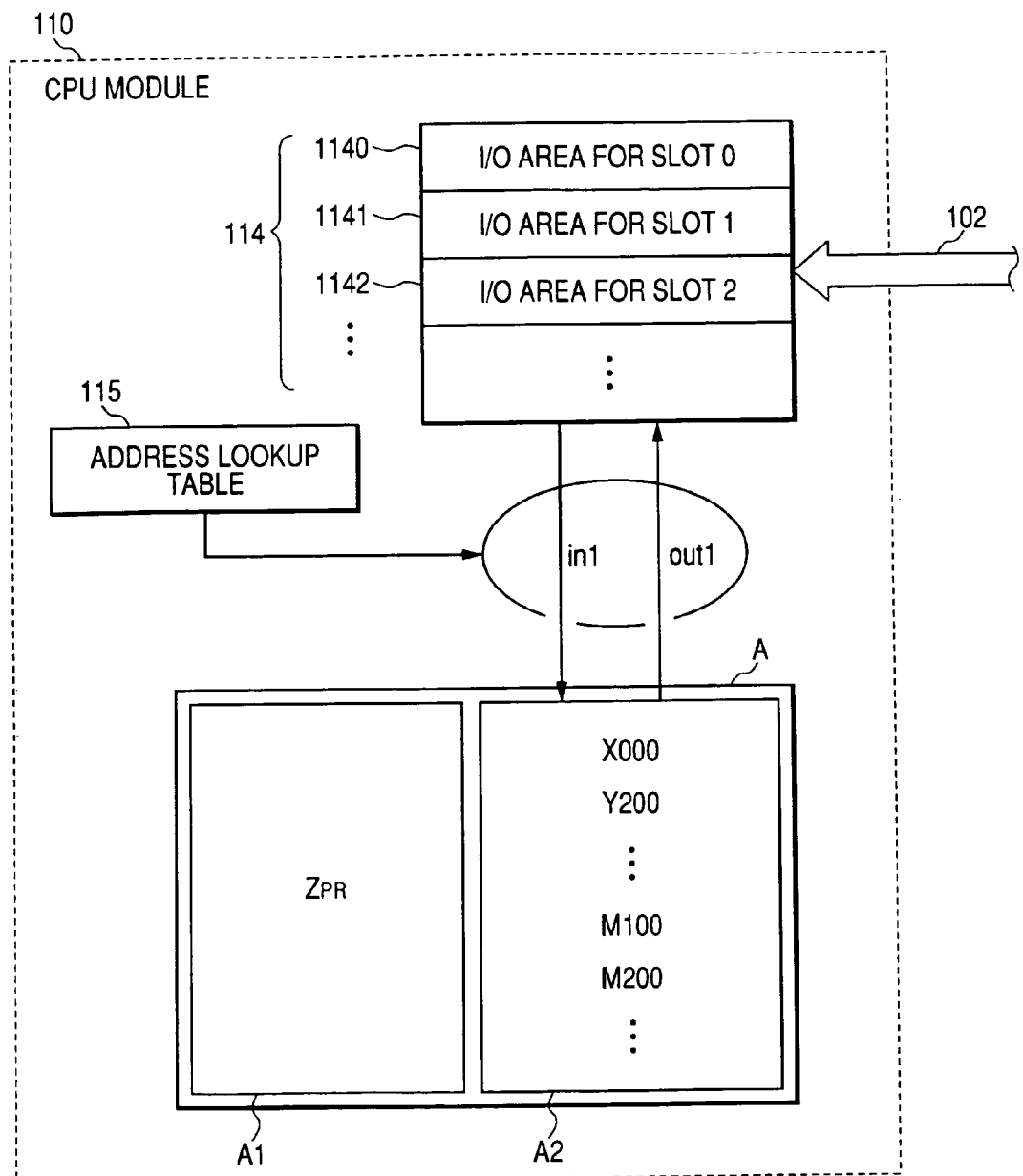
FIG. 4 is a schematic diagram illustrating a construction of the safety program Z and operations thereof.

In the step 470, the allocated function blocks FB1, FB2, . . . are linked with one another, so that a desired safety program Z is created on the area A of FIGS. 1 and 4.

In the step 475, the safety program Z created in the area A is stored in a predetermined area in the secondary storage device. Finally, in the step 480, the condition of the CPU module 110 is changed into a ready state (i.e., a safety program executable condition). Then, the following processing is performed.

(1) A predetermined completion code (for example, (H, L)=('00'h, '1–'h)) indicating that the authentication manipulation is completed is set in the identification information display 110c (H: for uppermost 2 digits) or the identification information display (L: for lowermost 2 digits).

(2) The condition of the C.OK lamp 110i is changed from the turn-off state to the turn-on state.

Through the aforementioned processing, the safety program Z is automatically created on the area A, and its condition is set to a ready state (i.e., a safety program executable state). At this moment, the key switch 110b is changed to the aforementioned condition 1 (RUN), so that the safety program Z can be operated.

Other Variations

The embodiment of the present invention is not limited to the aforementioned ones, but may be changed as follows. Such variations or changes also contribute to obtaining the effect of the present invention based on functions of the present invention.

(Variation 1)

Although, in Embodiment 1, the safety program Z that has been automatically created on the main memory area A is directly executed, the safety program may be stored in the secondary memory device in the step 475, and safety program may be read from the secondary memory device to be re-executed. In this case, if an ID number comparison unit for comparing the ID number obtained from the ID number obtaining unit 111 with the ID number obtained from the ID number storage 117 is provided in the CPU module 110, the connection construction of the I/O module directly authenticated by the self-manipulation of a user can be always guaranteed based on the ID number memory information even time the safety program Z is read from the secondary memory device and re-executed.

What is claimed is:

1. A safety PLC comprising:
    an I/O module to which a safety device for detecting a predetermined condition at any time is connected;
    a CPU module that executes a safety program for managing the I/O module; and
    a communication unit that interconnects the I/O module and the CPU module,
    wherein the CPU module includes:
        a PIN code memory that stores a PIN code for authenticating that the safety program satisfies a predetermined standard;
        a PIN code input unit that receives a user designation of the PIN code;
        a function block memory that stores a plurality of predetermined function blocks;
        a program auto-creating unit that automatically creates the safety program by combining the predetermined function blocks when the PIN code designated by the user coincides with the PIN code stored in the PIN code memory; and
        a program authentication unit that executes the safety program when the PIN code designated by the user coincides with the PIN code stored in the PIN code memory.

2. The safety PLC according to claim 1, wherein the CPU module includes an ID number obtaining unit for obtaining an ID number representing a classification of a corresponding I/O module from the I/O module connected to the communication unit, and
the safety program is automatically created by sequentially linking predetermined function blocks corresponding to each ID number based on a connection order of the I/O modules or a slot number order of slots to which the I/O modules are connected.

3. The safety PLC according to claim 1, wherein the CPU module includes:
    an ID number input unit that allows a user to designate the ID number; and
    an ID number memory that stores the ID number input from the ID number input unit, and
the program authentication unit includes an ID number comparison unit for comparing the ID number obtained from the ID number obtaining unit with the ID number obtained from the ID number memory when the safety program that has been automatically created is executed.

4. The safety PLC according to claim 2, wherein the CPU module further includes an address look up table associating input and output data of each function block to a corresponding one of the I/O modules based on the ID number and address of the I/O module, the input and output data being stored in a main memory of the CPU module.

* * * * *